(No Model.)
O. VARING.
PHOTOGRAPHIC CAMERA.
No. 347,451. Patented Aug. 17, 1886.
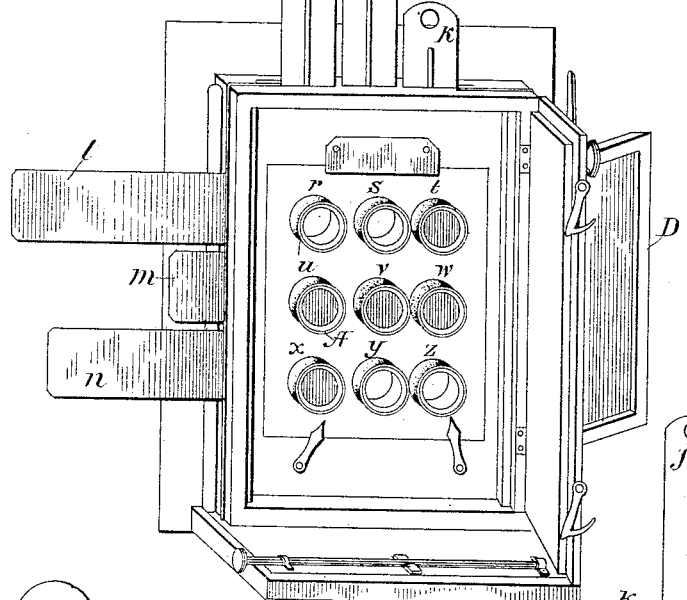
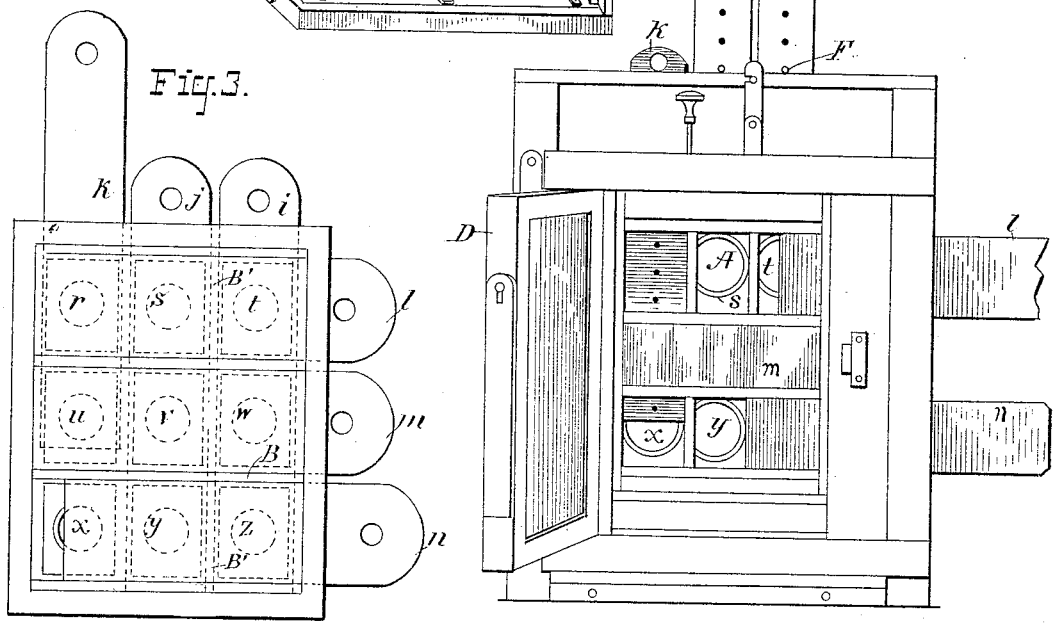
ATTEST:
J. A. Mindle
Edward P. Thompson
INVENTOR:
Olaf Varing
BY
W. J. Johnston
ATTORNEY

UNITED STATES PATENT OFFICE.

OLAF VARING, OF CHRISTIANIA, NORWAY.

PHOTOGRAPHIC CAMERA.

SPECIFICATION forming part of Letters Patent No. 347,451, dated August 17, 1886.

Application filed January 16, 1886. Serial No. 188,730. (No model.)

*To all whom it may concern:*

Be it known that I, OLAF VARING, a subject of the King of Norway, and residing in the town of Christiania and Kingdom of Norway, have invented certain new and useful Improvements in Photographic Cameras; and I do hereby declare the following to be a full, clear, and exact description of the invention, such as will enable others skilled in the art to which it appertains to make and use the same.

My invention relates to those cameras which are regulated for the purpose of taking several independent or similar photographs on the same plate, several objective lenses being provided.

The object of the invention is to enable the photographer to expose any part of the plate whatever, (corresponding with the different objectives,) so that either all the objectives may throw an image upon the sensitive plate, or so that only a few of the total number of images may be formed.

My invention consists in providing a camera with such an attachment that it may be adapted to photograph a multiple number of portraits simultaneously, or to photograph a multiple number of portraits of as many different persons, or to photograph the same person in a multiple number of positions, any one of the above results being accomplished without entering a dark room.

In order to illustrate the practical manner of carrying out the invention, and to enable others skilled in the art to which the invention relates to make and use the same, drawings are hereunto annexed and described, in which similar letters represent corresponding elements, and in which each part referred to is designated by a single character.

Figure 1 shows a general front view of a camera provided with my invention. Fig. 2 shows a back view of the same, and Fig. 3 shows that part of the camera relating particularly to my invention.

The camera, as far as my invention is concerned, consists of the combination of objectives $r\ s\ t\ u\ v\ w\ x\ y\ z$ in the ordinary camera; a frame, called a "dazzling-frame," and consisting of cross-pieces B and B', preferably at right angles to one another, respectively; screens, slides, or pushes $i\ j\ k\ l\ m\ n$, fitting between said pieces and adapted to slide up and down or to one side, according as to whether they are the vertical ones or the horizontal ones.

The other parts of the apparatus are not involved in my invention, and therefore do not need description, except to remark that D may be taken to represent the frame adapted to hold the sensitive plate P, and that E are holes adapted to receive a pin, F, as a means of holding up the vertical screens to greater or less heights. These holes do not pass through the screens, but only to the back ridges, G.

The operation is readily apparent. However, for the sake of form and illustration, suppose it is desired to expose the objective $y$, it is only necessary to withdraw the screens $j$ and $n$. Further, to expose $y$, $r$, and $s$, withdraw $n$, $j$, $l$, and $i$. It may be observed that $x$ is the only objective which cannot be caused to remain closed while all the others are open or exposed. Further, by experiment, the operator will find that the spaces which he desires to be opened at the same time must be selected from among those which lie behind the same screen, and he must commence exposing the spaces which are nearest the handle of the screen.

The invention is not limited to the precise construction hereinbefore described and shown, as it is evident that many modifications may be made therein without departing from the spirit of the invention.

What I claim is—

1. In a camera provided with two or more objectives and one sensitive plate, the combination of two screens with each of said objectives, the objectives being placed between the plate and the screens, substantially as set forth.

2. In a camera, the combination of objectives, a sensitive plate, and two sets of screens, the screens of one set being at an angle to those of the other set, and all the screens being adjustable and located between said objectives and said plate, substantially as and for the purpose described.

3. In a camera, the combination of objectives and two sets of screens covering said objectives, the one set being perpendicular to the other set, and any one of said screens being adjustable or movable in the direction of their respective lengths, substantially as and for the purpose set forth.

In testimony whereof I have signed this specification, in the presence of two subscribing witnesses, November 25, 1885.

OLAF VARING.

Witnesses:
 JACOB UZLLER,
 OSCAR WINGE.